Dec. 5, 1933.     A. MARELLI     1,938,527
GRATED CHEESE BASIN WITH AUTOMATIC OPENING AND SHUTTING DEVICE
Filed Oct. 3, 1931
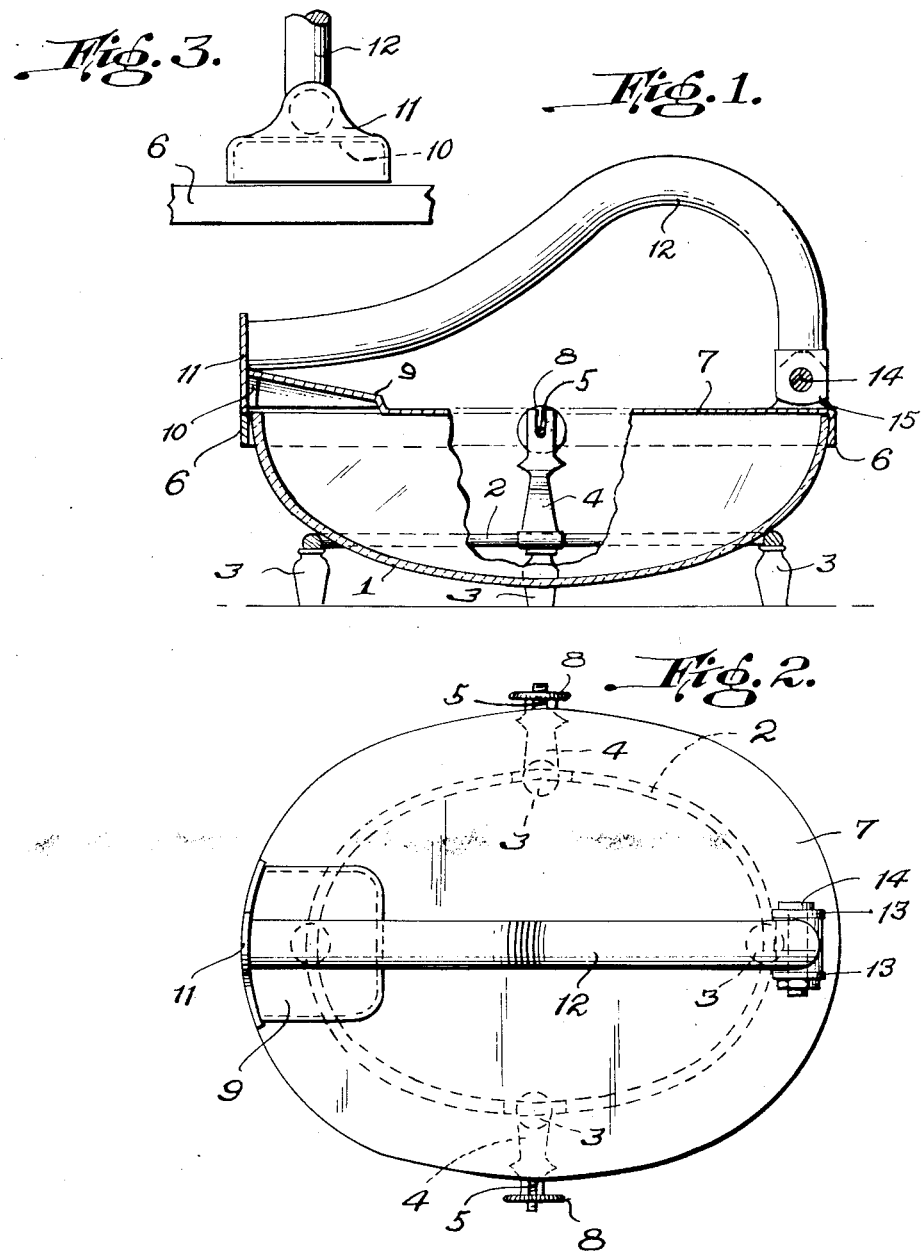
INVENTOR.
A. Marelli
BY: Marks & Clerk
ATTORNEYS.

Patented Dec. 5, 1933

1,938,527

UNITED STATES PATENT OFFICE 1,938,527

GRATED CHEESE BASIN WITH AUTOMATIC OPENING AND SHUTTING DEVICE

Angelo Marelli, Milan, Italy

Application October 3, 1931, Serial No. 566,819, and in Italy September 24, 1930

3 Claims. (Cl. 65—60)

I have filed application in Italy on Sept. 24, 1930.

This invention relates to improvements in dispensing devices adapted for table use and has for its primary object to provide a device for containing grated cheese, and including means acting when the device is lifted to uncover a dispensing slot and thereby permit the contents to be discharged therethrough.

A further object of the invention is the provision of a dispensing device including a container and a handle associated therewith in which the handle is movably connected with the container and carries a closure plate for the dispensing slot.

In the accompanying drawing wherein an approved embodiment of the invention is illustrated:

Figure 1 is a longitudinal section on the line 1—1 of Fig. 2, partly broken away.

Fig. 2 is a top plan view of the dispensing device.

Fig. 3 is a fragmentary front elevation of a portion of the cover, handle and closure plate.

Referring to the drawing in detail, the numeral 1 indicates a bowl-shaped container constructed of glass or like material and supported in a frame 2 provided with legs 3. At its opposite sides, the frame 2 is provided with uprights 4 having slotted upper ends receiving the threaded pins 5 projecting outwardly from the opposite sides of the depending flange 6 carried by the cover plate 7.

The flange 6 snugly surrounds the upper edge of the container 1 and the cover plate 7 forms a closure therefor. Nuts 8 are threaded on the pins 5 and when tightened they serve in connection with the uprights 4 to clamp the container 1 between the frame 2 and the cover plate 7.

The container is preferably elongated in one direction and at one end the cover plate 7 is raised as indicated at 9 and spaced from the contiguous portion of the flange 6 to provide a relatively narrow dispensing slot 10.

A curved arm 12 is pivotally mounted at one end on a pivot 14 supported by uprights 13 attached to the cover plate 7. The upward movement of the arm 12 with respect to the cover plate 7 is limited by a shoulder 15 provided at the pivoted extremity of the arm and engageable with the cover plate 7. The arm 12 extends across the center of the cover plate 7 and is provided at its free end with a closure plate 11 which, when the arm 12 is at rest, lies across the dispensing slot 10 and closes the latter.

When the dispensing device is not in use, the container 1 is protected against the admission of dust and the like by the cover plate 7 and the closure plate 11 which closes the slot 10. The medial portion of the arm 12 as shown in Fig. 1, is bowed upwardly so as to provide a handle and thus when the dispensing device is lifted by means of the handle, the latter turns about the pivot 14 until its movement is arrested by engagement of the shoulder 15 with the cover plate 7. The movement of the arm 12 relatively to the cover plate 7 causes the closure plate 11 to be displaced thereby uncovering the dispensing slot 10 in order that the contents of the container 1 may be dispensed.

Having now described my invention what I claim as new and desire to secure by Letters Patent is:

1. A food dispensing device comprising a bowl-like container having an open top, a cover plate arranged over the open top of the bowl and having a raised portion disposed in spaced relation to the bowl to provide a dispensing slot, a closure plate normally closing said slot, a bowed arm pivotally secured to said cover plate at one end and carrying said closure plate at the opposite end, said closure plate being normally maintained in closed position by gravity and the medial portion of said arm constituting a handle for lifting the container, the closure plate being displaced incident to the forward movement of the arm to cover said slot.

2. An arrangement as claimed in claim 1, characterized by the provision of means for limiting the swinging movement of said arm.

3. An arrangement as claimed in claim 1, characterized by the provision of a supporting frame for said container, and means for removably securing said container in said frame.

ANGELO MARELLI.